E. BURTNESS.
FRICTION CLUTCH.
APPLICATION FILED OCT. 15, 1912.
1,095,808.
Patented May 5, 1914.
2 SHEETS—SHEET 1.
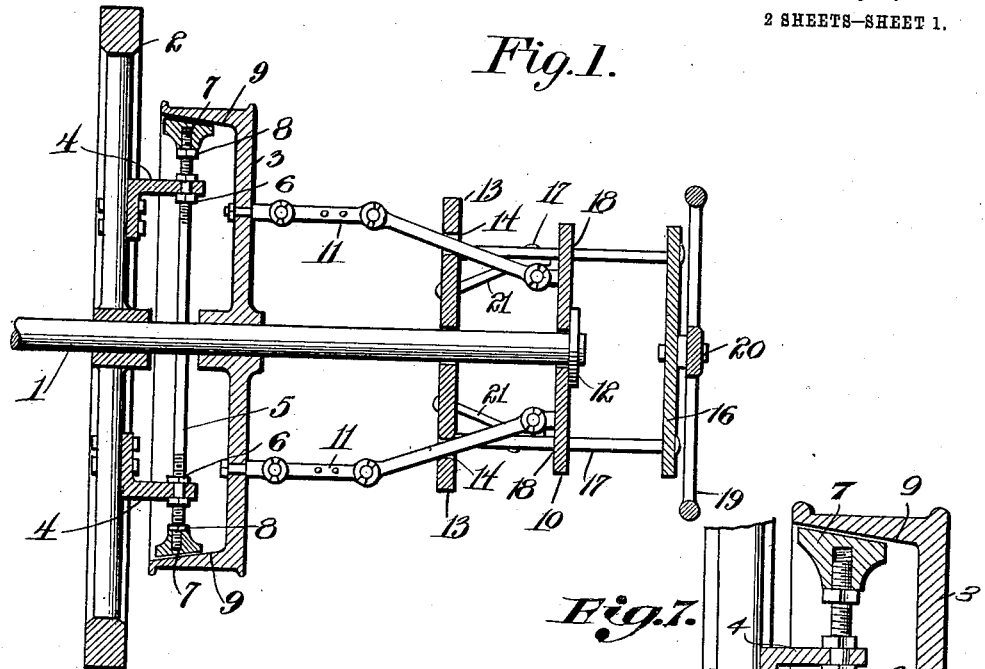
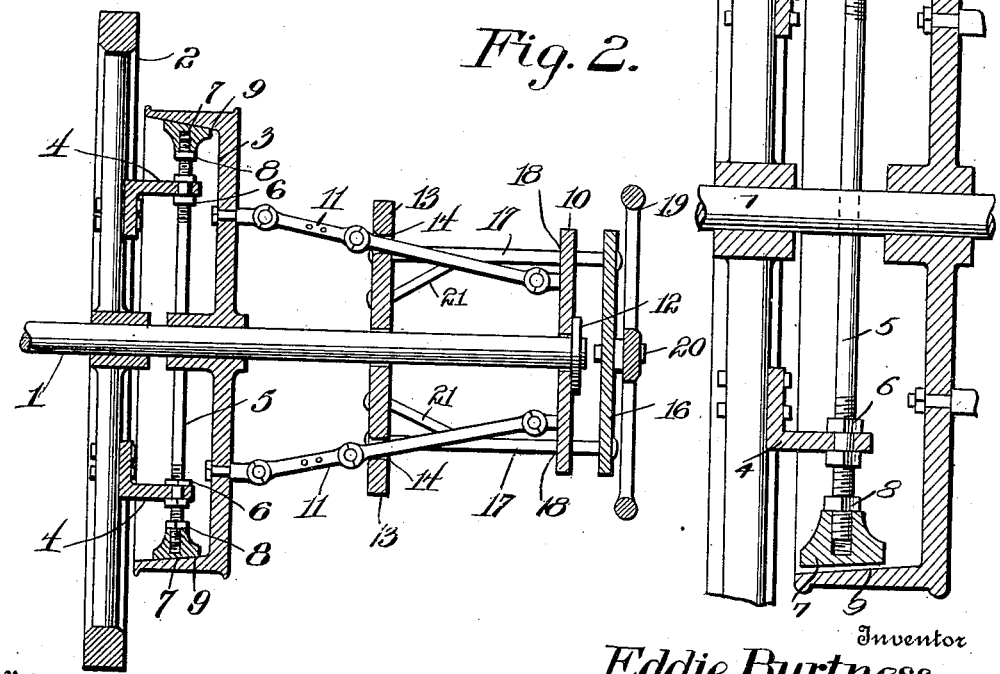
Witnesses
W. H. Mulligan.
U. B. Hillyard.
Inventor
Eddie Burtness
By Victor J. Evans
Attorney E. BURTNESS.
FRICTION CLUTCH.
APPLICATION FILED OCT. 15, 1912.
1,095,808.
Patented May 5, 1914.
2 SHEETS—SHEET 2.
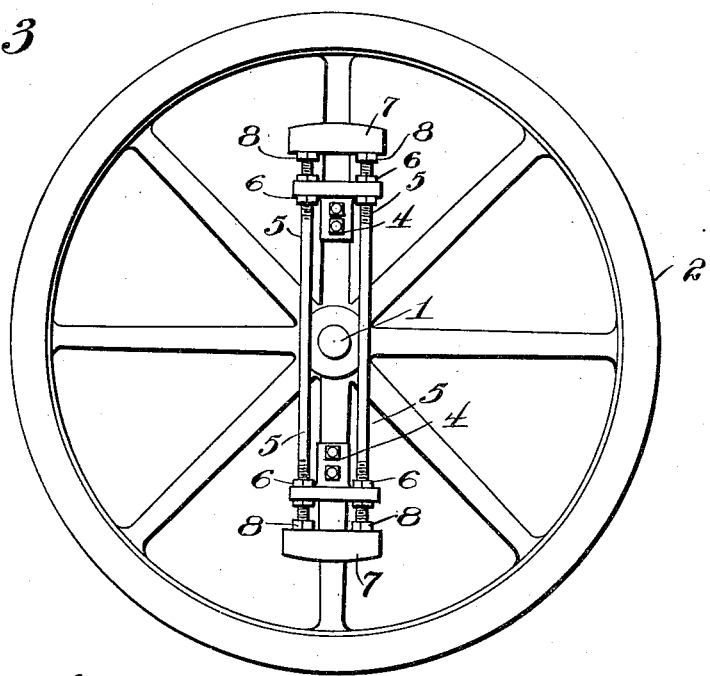
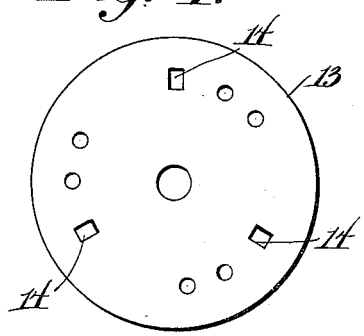
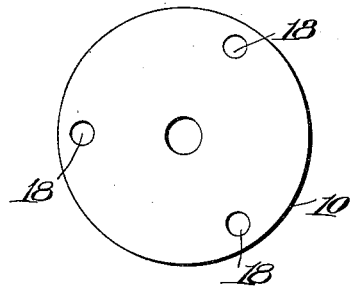
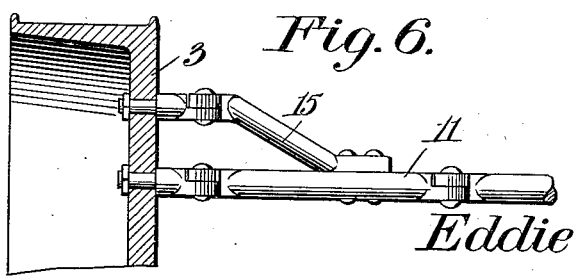
Witnesses
Wm H. Mulligan
V. B. Hillyard
Inventor
Eddie Burtness.
By Victor J. Evans.
Attorney

UNITED STATES PATENT OFFICE.

EDDIE BURTNESS, OF ORFORDVILLE, WISCONSIN.

FRICTION-CLUTCH.

1,095,808.  Specification of Letters Patent.  Patented May 5, 1914.

Application filed October 15, 1912. Serial No. 725,907.

*To all whom it may concern:*

Be it known that I, EDDIE BURTNESS, a citizen of the United States, residing at Orfordville, in the county of Rock and State of Wisconsin, have invented new and useful Improvements in Friction-Clutches, of which the following is a specification.

This invention has relation to clutches of the friction type, the purpose being to devise a clutch of this variety which may be readily adapted to parts in use, thereby enabling the fly wheel of any engine or mechanism to be utilized without requiring its replacement by one of special design.

While the invention is particularly adapted for engines of the explosive type it is to be understood that the clutch may be employed in any relation for coupling the parts to be driven.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a sectional view of a clutch embodying the invention, showing the parts separated. Fig. 2 is a view similar to Fig. 1, showing the parts in clutched engagement. Fig. 3 is a front view of the fly wheel provided with one part of the clutch. Fig. 4 is a front view of the operating disk. Fig. 5 is a detail view of the fixed disk forming an abutment for the toggle levers between the pulley and the said abutment disk. Fig. 6 is a detail view showing the connections between the pulley and disks. Fig. 7 is a detail view of one of the rods which have their ends oppositely threaded, showing the friction blocks and portions of the supporting brackets, said parts being on a larger scale.

Corresponding and like parts are referred to in the following description, and indicated in all the views of the drawings, by the same reference characters.

The shaft 1 supports a fly wheel 2 and a pulley 3, the latter being loose upon the shaft. The fly wheel 2 is secured to the shaft 1 so as to rotate therewith. The pulley 3 is adapted to be driven from any source of power by means of a belt or other transmission. Brackets 4 are secured to the fly wheel 2 and support rods 5, which are loose therein. Pairs of nuts 6 are threaded upon opposite end portions of each of the rods 5 and embrace opposite sides of the horizontal portions of the brackets 4. The nuts 6 provide means for adjusting the rods also for securing them to the brackets in the required adjusted position. Each of the rods 5 has its end portions oppositely threaded and fitted into corresponding threaded openings formed in blocks 7, which constitute members of the clutch. When the nuts 6 are loosened the rods 5 may be turned to adjust the blocks 7 to cause the clutch when set to grip more or less tightly according to the result to be attained. Jam nuts 8 mounted upon the threaded end of the rod 5 serve to secure the block 7 in the adjusted position. The rods 5 may be turned by means of a pipe wrench or other tool. The rim of the pulley 3 has an inner conical face 9, which forms the other member or part of the clutch. The outer faces of the blocks 7 are made tapering to match the conical face 9 of the pulley so that when the two parts 7 and 9 are in engagement the frictional contact is such as to cause the pulley 3 and fly wheel 2 to rotate. When the clutch is set the pulley 3 is moved toward the fly wheel 2 and when the clutch is released the pulley 3 is moved away from the fly wheel 2.

Movement of the pulley is effected by the following means: A disk 10 is mounted upon the shaft 1 and is free to turn thereon and forms an abutment for toggle levers 11, which connect the pulley 3 with the disk 10. A set collar 12 is secured to the shaft 1 and forms a stop for the disk 10 to sustain the end thrust of the toggle levers when moved to set the clutch. An operating disk 13 is slidably mounted upon the shaft 1 and is free to turn thereon, said disk having openings 14 through which the outer members of the toggle levers 11 pass. When the operating disk 13 is moved toward the pulley 3 the toggle levers are brought into alinement, thereby advancing the pulley 3 toward the fly wheel 2 and bringing the clutch members 7 and 9 into engagement. Movement of the disk 13 away from the pulley 3 breaks the toggle levers outwardly and moves the pulley 3 away from the fly wheel 2, thereby releasing the clutch. When the toggle levers 11 aline they become locked and hold the clutch set. The toggle levers are stayed by means of braces 15 so as to resist the additional strain. The operating disk 13 is adapted to be moved by hand or other convenient way to admit of setting or releasing the clutch. As shown a spider or like part 16 is arranged in line with the shaft 1 and rods 17 connect the spider with the disk 13, said rods passing through openings 18 formed in the abutment disk 10. A hand wheel 19 or like operating part is connected with the spider 16 in such a manner as to admit of the hand wheel being grasped and operated to move the disk 13 on the shaft 1 to set or release the clutch as may be required. A bolt or like fastening means 20 connects the parts 16 and 19 in such a manner as to admit of the part 16 rotating while the part 19 is grasped to operate the movable clutch member. The rods 17 are stayed by means of braces 12.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. A friction clutch comprising a rotary member, means extending along one face of the member and projecting a like distance upon opposite sides of a medial point, friction blocks mounted upon the ends of said means, a second member having a conical clutch face to engage the said friction blocks, and means for adjusting the friction blocks with reference to the said conical clutch face.

2. A friction clutch comprising a rotary member, means rotatably mounted upon the rotary member and extending an equal distance upon opposite sides of a medial point and having its end portions oppositely threaded, friction blocks mounted upon and having screwthread connection with the threaded ends of said means, and a second member having a conical clutch face to engage the said friction blocks.

3. A friction clutch comprising a member, brackets secured to the said member and projecting laterally therefrom, rods arranged upon opposite sides of the axis of said member and mounted in the brackets to turn therein, said rods having their end portions oppositely threaded, means for clamping the rods to the brackets in an adjusted position, friction blocks mounted upon and having screwthread connection with the threaded ends of the rods, a second member having a conical clutch face to engage the friction blocks, and means for relatively moving the two members.

4. In a clutch the combination of a rotary part provided with a clutch member, a second rotary part provided with a clutch member to engage the first mentioned clutch member, toggle levers having connection with the second rotary part, and an operating member engaging the toggle levers on opposite sides to aline or break the joint thereof to move the second rotary member to set or release the clutch.

5. In a clutch the combination of a clutch member, a second clutch member movable toward and away from the first mentioned clutch member, an abutment, toggle levers between said abutment and the second clutch member, and a disk engaging the toggle levers on opposite sides to aline or to break the joints thereof to effect a movement of the second clutch member to set or release the clutch.

6. In a clutch the combination of relatively movable clutch members, an abutment, toggle levers between said abutment and the movable clutch member, an operating disk engaging the toggle levers on opposite sides, an operating part, rods passing through the said abutment and connecting the operating part with the operating disk, and means for moving the operating part and the operating disk connected therewith toward or away from the clutch members for alining or breaking the joints of the said toggle levers to set or release the clutch.

7. In a clutch the combination of relatively movable clutch members, an abutment, toggle levers between said abutment and the movable clutch member, an operating disk engaging the toggle levers on opposite sides, an operating part, rods passing through the said abutment and connecting the operating part with the operating disk, braces for the toggle levers and rods between the operating part and operating disk to stay the same against torsional strain, and means for moving the operating part and operating disk toward and away from the clutch members.

In testimony whereof I affix my signature in presence of two witnesses.

EDDIE BURTNESS.

Witnesses:
CHAS. TAYLOR,
ETHEL COMPTON.